United Sta
Tellerman

[15] 3,698,793
[45] Oct. 17, 1972

[54] SOLID STATE DISPLAY
[72] Inventor: Jacob Tellerman, Bayside, N.Y.
[73] Assignee: Kollsman Instrument Corporation, Syosset, N.Y.
[22] Filed: March 11, 1971
[21] Appl. No.: 123,132

Related U.S. Application Data

[63] Continuation-in-part of Ser. No. 700,127, Jan. 24, 1968, abandoned.

[52] U.S. Cl. ............. 350/160 R, 40/130 K, 350/161, 350/285
[51] Int. Cl. ......... G02f 1/36, G09f 13/00, G02f 1/34
[58] Field of Search ..... 350/285, 16 D, 161; 40/28 C, 40/130 K

[56] References Cited

UNITED STATES PATENTS

| | | | |
|---|---|---|---|
| 2,281,280 | 4/1942 | Gabor | 350/161 |
| 2,565,514 | 8/1951 | Pajes | 350/285 |
| 3,315,388 | 4/1967 | Stahl | 40/28 C |
| 3,349,511 | 10/1967 | Aronoff | 40/130 K |

*Primary Examiner*—Ronald L. Wibert
*Assistant Examiner*—V. P. McGraw
*Attorney*—E. Manning Giles, J. Patrick Cagney, Michael A. Kondzella and Richard A. Zachar

[57] ABSTRACT

A movable element is selectively operated to press an opaque member into engagement with a selected region of a light diffusing boundary to convert such region between a light absorbing condition and a light reflecting condition. An array of movable elements can be selectively actuated to define a variety of patterns that can be presented on the illuminated side of the boundary. The movable elements may be piezoelectric or magneto-strictive elements. In one embodiment, the movable elements carry a soft black rubber surface for contact with an optical boundary defined by the rear face of a transparent glass panel. In another embodiment, the movable elements carry smooth black surfaces for contact with rubber films on the rear face of a transparent glass panel to define an optical boundary.

21 Claims, 19 Drawing Figures

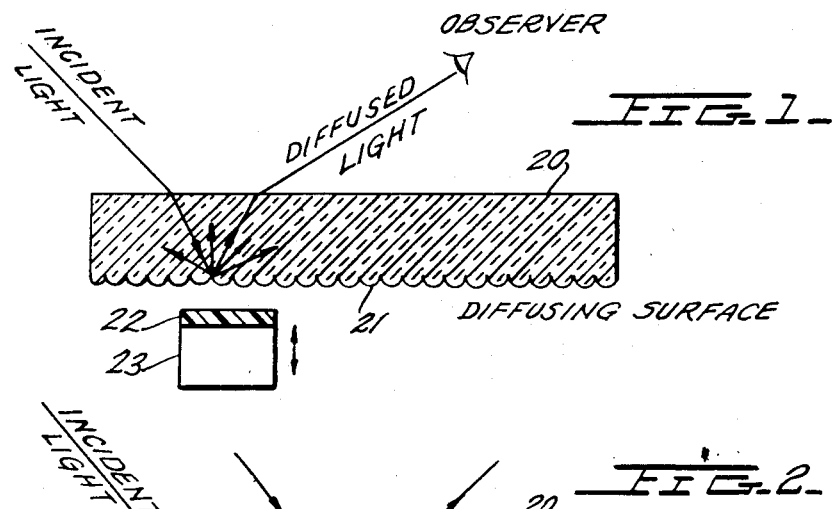
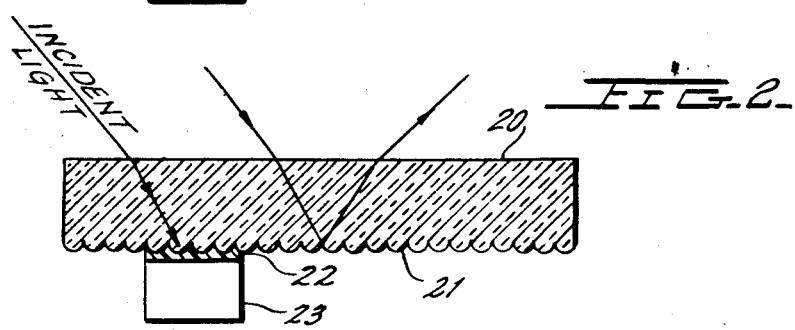
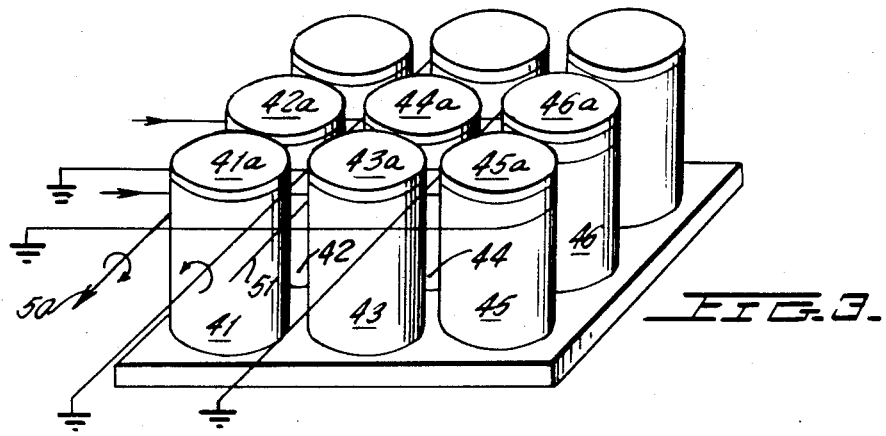
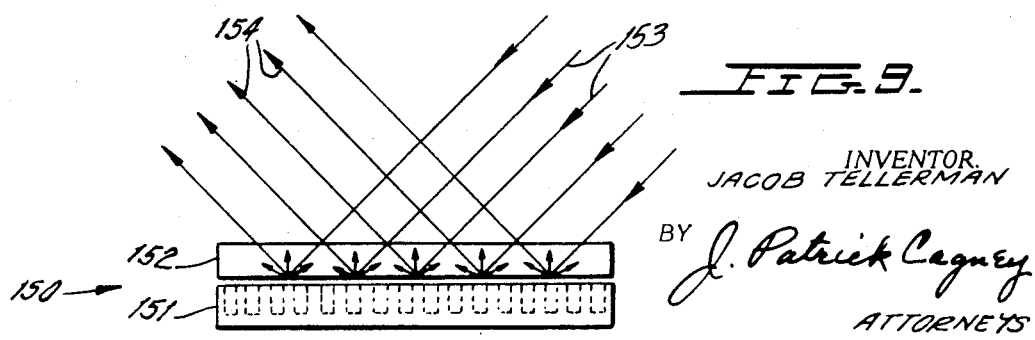

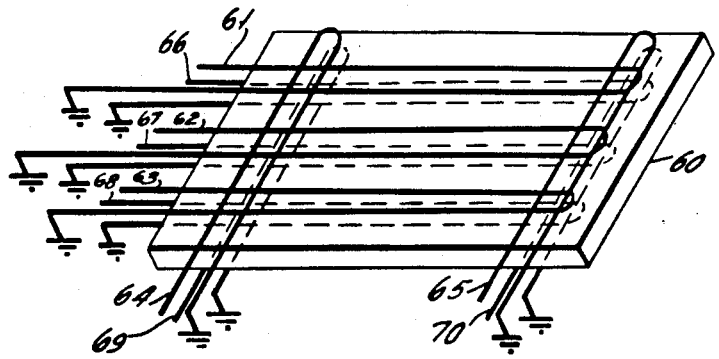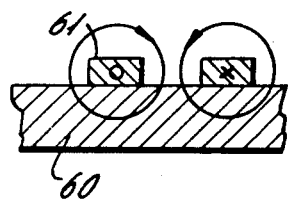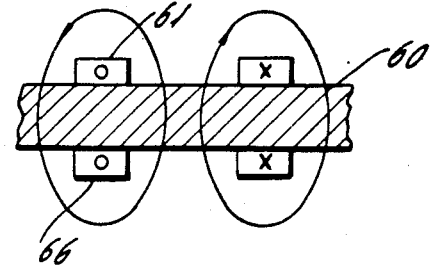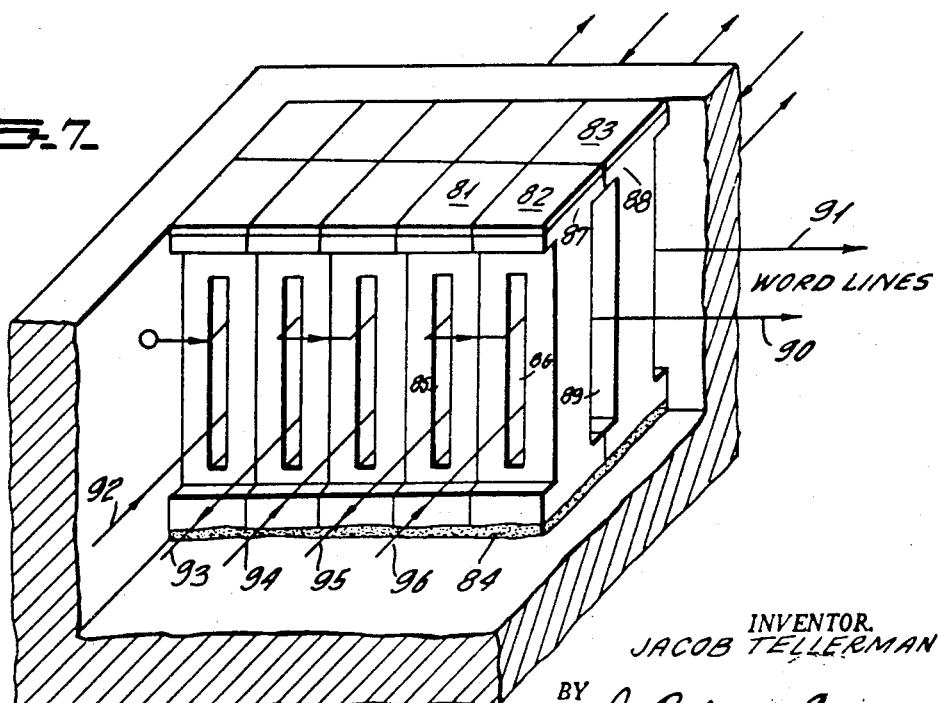

INVENTOR.
JACOB TELLERMAN
BY J. Patrick Cagney
ATTORNEYS

INVENTOR.
JACOB TELLERMAN
BY J. Patrick Cagney
ATTORNEYS

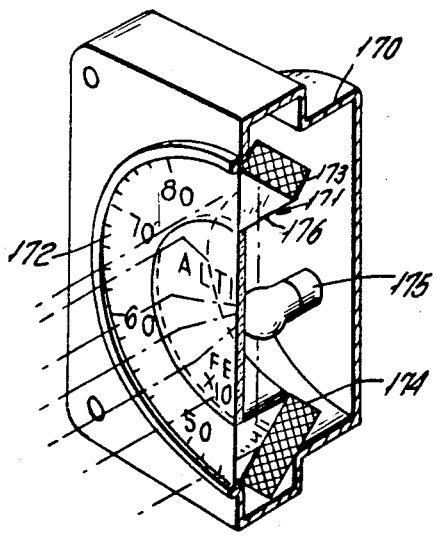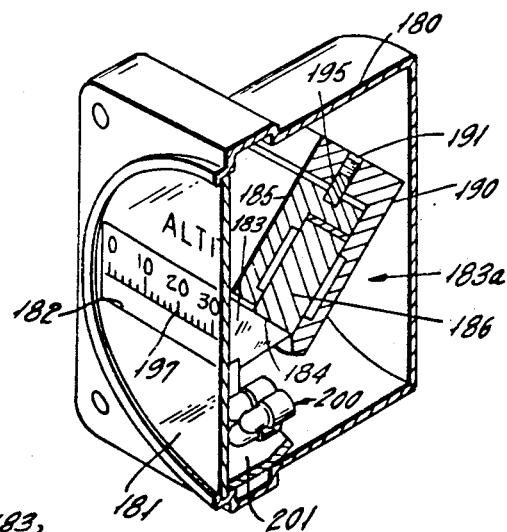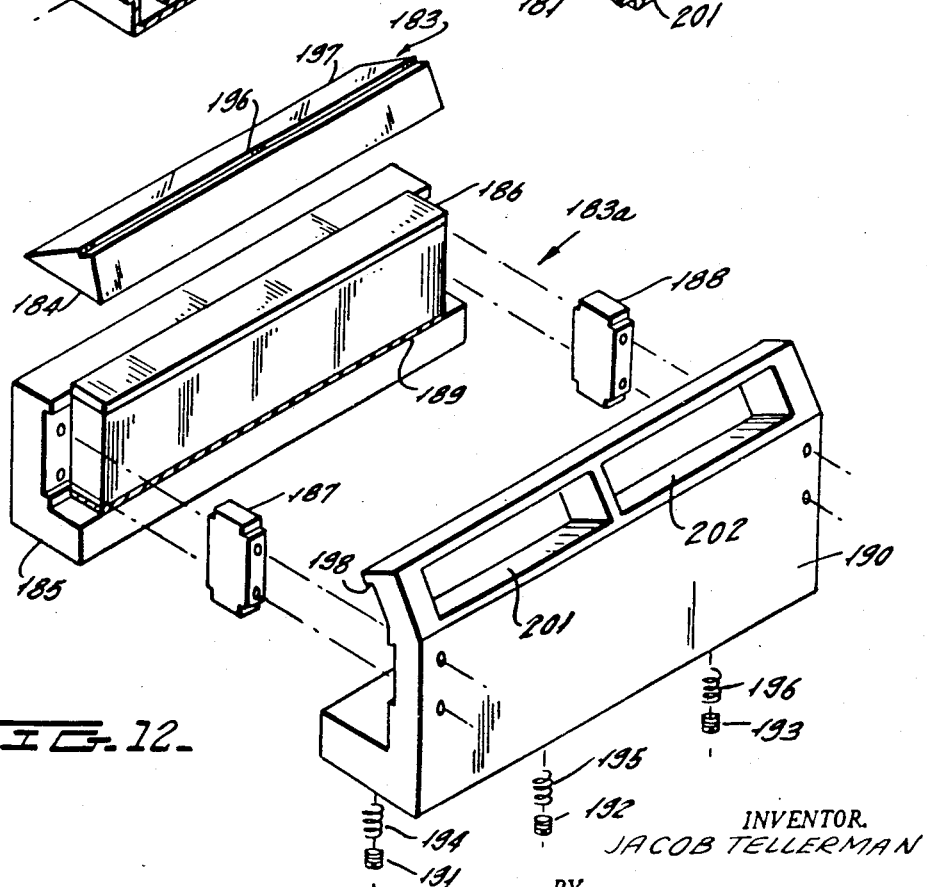

INVENTOR
JACOB TELLERMAN
BY J. Patrick Cagney
ATTORNEY

SOLID STATE DISPLAY

RELATED APPLICATION

This application is filed as a continuation-in-part of pending U.S. application Ser. No. 700,127 filed Jan. 24, 1968, and now abandoned, the disclosure of which, to the extent not inconsistent herewith, is specifically incorporated herein by this reference.

This invention relates to display apparatus, and more particularly, relates to a display apparatus wherein the diffusion of light by a diffusing body is locally controlled by a mosaic of elements which will cause a given pattern to appear on the surface of the diffusing body.

Kushner U.S. Pat. No. 3,376,092 describes a display apparatus in which individually movable frustrator elements move with respect to a normally totally reflecting body to selectively spoil total internal reflection at localized areas.

Many problems arise in this structure since the tolerances of the frustrator elements should be very close, since a difference in fractions of a wavelength of movement can drastically affect the percentage reflectance.

In accordance with the present invention, the light boundary controlled is a normally diffusing or light reflecting surface with the light reflecting surface being selectively controlled by engagement with one or more independently movable bodies which contact light absorbing material against localized regions of the surface. Also, through use of elastomers, tolerances are substantially simplified at lower cost, while the reliability and ruggedness of the apparatus is increased.

Accordingly, the invention provides a display device comprising means including an element of light transparent material having a display surface constituting an optical boundary capable of diffusing light impinging on said surface after travel through said element along a direction that obliquely intercepts the general profile of said boundary, a member of opaque material disposed adjacent to said surface and means for controlling positioning of said member into light absorbing contacting relationship with selected regions of said surface whereby said selected regions appear light absorptive when said contacting relationship exists or light reflective when said contacting relationship is removed.

In one embodiment, an irregular rear face, such as an etched surface, on a transparent glass panel functions as a light reflecting optical boundary that cooperates with an opaque compressible rubber member carried by the position controlling elements. In another embodiment, a transparent rubber film and an outer opal rubber film cooperate with a smooth rear face on the transparent glass panel to function as a light reflecting optical boundary that cooperates with an opaque rigid member carried by the position controlling members.

These embodiments allow either a black on white display or a white on black display. In either case, the display is of high contrast even under pronounced ambient light and affords a wide angle viewing range.

The position controlling elements are preferably solid state devices such as piezoelectric or magnetostrictive elements capable of providing a non-linear movement that exhibits an appreciable dimensional change only upon full excitation thereof. Typically, the full dimensional change is about one wavelength of visible light to effect a position change capable of converting the optical boundary between a light reflecting condition and a light absorbing condition.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same:

FIG. 1 is a schematic diagram of an optical system for illustrating the concept of the invention with the control element removed from the diffusing surface;

FIG. 2 is a diagram similar to FIG. 1 where the diffusion is prevented by the control element;

FIG. 3 is a perspective view which illustrates one manner in which magnetostrictive matrix of control elements can be formed;

FIG. 4 illustrates a further form of a magnetostrictive matrix plate in perspective view;

FIG. 5 illustrates the manner in which conductive lines may be formed on one surface of the plate of FIG. 4;

FIG. 6 illustrates the manner in which conductive lines are formed on both surfaces of the plate of FIG. 4;

FIG. 7 shows a perspective view of a second type of magnetostrictive control mosaic;

FIG. 9 illustrates the manner in which any of the mosaics of FIGS. 7, 7b, 8 and 8a may be arranged with respect to a diffusing body;

FIG. 10 is a perspective view of an altimeter cut through its center to illustrate the manner in which a conical ring-shaped control array can be used for a curved scale instrument;

FIG. 11 shows a perspective view of an instrument cut through the middle and illustrates the manner in which an array may be used for a straight scale instrument;

FIG. 12 is an exploded perspective view of the control array structure of FIG. 11;

Figure 7A:
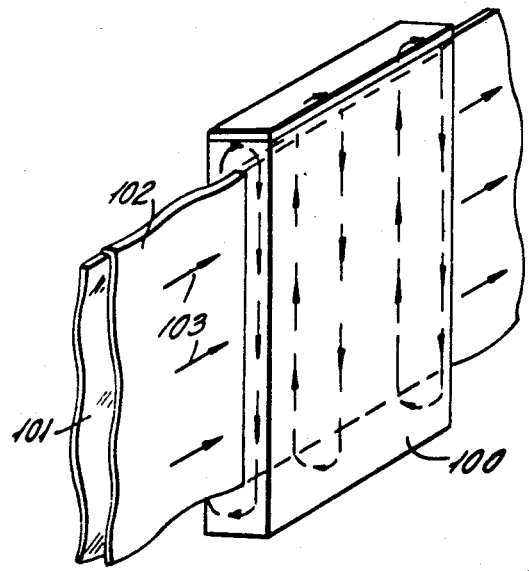
FIG.7a illustrates the manner in which a single longitudinally extending magnetostrictive element or slab can be formed.

Referring first to FIGS. 1 and 2, there is shown a glass panel 20 which may have any desired dimensions such as 4 inches by 4 inches by one-fourth inch, having its bottom surface ground or etched with acid to form surface irregularities of about 15 to 40 microinches deep. Thus the panel, when illuminated by incident light and when viewed over a wide range of angles, will have a white or light gray surface.

In accordance with the invention, the diffusion of light by surface 21 is prevented by moving a black, compressible film 22, carried on control element 23, into intimate engagement with surface 21, as shown in FIG. 2. Film 22 will make intimate contact with the ground surface 21 and will absorb light which would otherwise be reflected or diffused.

Satisfactory results have been obtained by the use of silicone rubber films, about 0.002 inch thick atop a piezoelectric element 23 which can be energized to move between the positions of FIGS. 1 and 2. The separation of rubber surface 22 and surface 21 by about 1 wavelength of visible light was found sufficient to reestablish reflection or diffusion by surface 21, with the spot engaged by rubber film 22 turning dark or light, in incident light, as viewed over a wide range of angles.

Increasing partial pressure on the film 22 against surface 21 causes a deeper gray color, thereby permitting the display to show a varying contrast.

A similar effect is obtained by forming a transparent rubber surface over surface 21 which is engaged by a smooth, darkened surface of element 23.

In accordance with the present invention, discrete areas of a flat display surface are provided with small movable control elements, such as elements 22-23, which move with respect to a diffusing surface. By suitably selecting and moving these elements toward the diffusing surface, it is clear that the diffusion of light by these areas will be controlled. Alternatively, a matrix of elements may be positioned to normally prevent diffusion with the individual elements being movable to a position permitting diffusion.

A typical arrangement of frustrator elements is schematically illustrated in FIG. 3. More specifically, FIG. 3 illustrates a support body 40 which has a plurality of magnetostrictive elements such as magnetostrictive element 41 through 46 mounted thereon.

Elements 41 through 46 are of any suitable magnetostrictive material and are characterized in being constricted in length in response to any axially directed magnetic field. The top and free surfaces of elements 41 through 46 carry black rubber films 41a to 46a which terminate in a common plane, and are located adjacent to a diffusing surface of a plate which will be placed atop elements 41 through 46.

The top surfaces of elements 41a through 46a would then be spaced by about 1 wavelength of green light from the diffusing boundary. In this condition, the diffusing boundary will be completely diffusing, and will have a uniform white appearance. A suitable circuit is then provided for causing the elements 41 through 46 to extend selectively, causing elements 41a to 46a to selectively engage the diffusing surface so that the engaged surface regions will turn dark.

This circuit is partially illustrated in FIG. 3 by conductors 50, 51, 52 and 53 which form a typical addressable system for selecting any of the magnetostrictive elements of the array. For example, if both conductors 50 and 52 are energized, the magnetic field of these conductors will add in element 41 and thus cause element 41 to extend and thus move its upper surface film 41a toward the reflecting boundary. Note that the element 42 will not extend substantially since the magnetic field due solely to conductor 50 will be too small.

The individual rods 41 through 46 may be made of nickel which has a magnetostrictive effect of approximately 30 parts per million. A rod length of approximately 1 inch would be sufficient to effect a displacement of the rod end of about 1 wavelength for light in the visible range.

While FIG. 3 illustrates discrete magnetostrictive elements, FIG. 4 illustrates an arrangement utilizing a single sheet 60 of magnetostrictive material having a rubber film surface which is used as a sub-surface matrix plate. The drive lines for controlling the discrete area operation of plate 60 are the conductors 61 through 65 on the upper surface of plate 60 and which are deposited on the plate through any suitable plating type technique. FIG. 5 shows a cross-section of the portion of plate 60 which receives conductor 61.

A second set of conductors may then be plated on the bottom surface of sheet 60 and includes conductors 66 through 70, as illustrated in FIG. 6. Note that current input of the aligned conductors of FIG. 6 is in the same direction so that their magnetic field is additive. The use of the double current flow arrangement of FIG. 6 causes the lines of magnetic force to extend completely through body 60 rather than just through the surface thereof, as illustrated in FIG. 5.

In operation, the magnetic lines of force through the body 60 and particularly at those regions of intersecting lines and columns will tend to cause bumps or form depressions in the rubber surface film of the material. This, of course, can be used to control the diffusion of an adjacently positioned diffusing boundary.

As was the case of FIG. 3, a non-linear magnetostrictive material can be used for plate 60 to suppress the effects along the energized row and column lines, while allowing an appreciable dimensional change only at the intersection of a selected row and column. For matrix selection systems, if the frustrator material has displacement hysteresis effects, the display will exhibit a memory characteristic.

A further form of magnetostrictive mosaic is shown in the perspective view of FIG. 7. More specifically, FIG. 7 illustrates a support frame 80 which may be of any suitable rigid material which receives a plurality of pillar elements such as elements 81, 82 and 83 which have black rubber film on their upper surfaces. A suitable bonding cement 84 secures these elements to the frame 80. Each of the pillar elements may be formed of a suitable ferrite which is molded to have internal slots such as slots 85 and 86 which extend completely through pillars 81 and 82. The elements further have extending flange heads at their top and bottom such as upper flange heads 87 and 88 shown for elements 82 and 83, respectively. The flange head arrangement is used to define a channel 89 which extends completely along the junction between adjacent rows of of elements. The diffusing surface to be controlled is then located atop frame 80 and the upper ends of the pillars such as pillars 81 through 83.

In order to selectively energize individual elements of the array, a first set of electrical conductors such as conductors 90 and 91 enter the frame 80 and are wound about the various pillars in the manner shown. These can be considered to be the "word lines" of the array. A second set of conductors such as conductors 92 through 96 which carry current in alternate directions then pass through channels such as channel 85 and form the "bit line".

The operation of the system will clearly be such that only the pillar at the intersection of an energized word line and bit line will be substantially extended in a compressive direction. Thus, diffusion at the area adjacent this element will be eliminated.

While the array of magnetostrictive elements is shown in FIG. 7 as formed or rows and columns of pillar elements, it will be understood that the elements can be formed of parallel elongated members, or slabs, stacked directly atop one another. By way of example, FIG. 7a illustrates an elongated magnetostrictive element which is a slotted slab of a suitable magnetostrictive material having a black rubber coat on its upper edge.

Figure 7B:
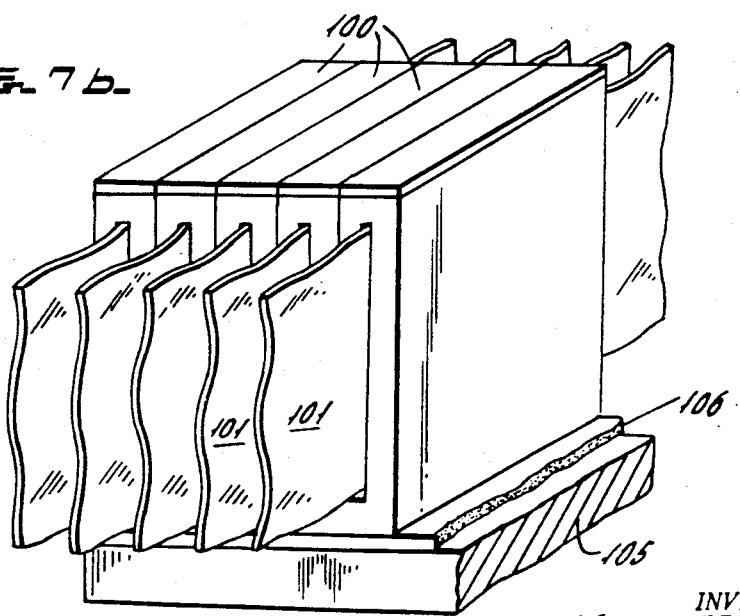
FIG. 7b illustrates the manner in which the elements of FIG. 7a are arranged with respect to one another in a matrix of elements.

A flat conductor 101 which has an insulation film coating 102 passes through slotted opening in member 100, whereby current flow, indicated by arrow 103, will cause a magnetic field in the direction of the dotted line arrows causing movement of the film on top of the slab. The slabs, such as slab 100 of FIG. 7a, are then assembled in the array illustrated in FIG. 7b where each of the slabs is secured to a suitable base, such as base 105, as by a suitable bonding cement 106. The upper face of each of the elements 100, which carry the rubber film discussed, for example, for the elements of FIG. 7 are then mounted in close proximity to a diffusing surface in a manner similar to that discussed for the array of FIG. 7. Note that the film can be continuous.

In the arrays of FIGS. 7 and 7b, magnetostriction is dependent only upon the magnitude of the magnetic flux and is independent of its direction. Therefore, both legs of each of the elements will extend by equal amounts, thus lengthening the energized elements. It will be noted that each individual element provides a closed path for magnetic flux so that the flux carried by one element has no effect upon its neighbors.

Figure 8:
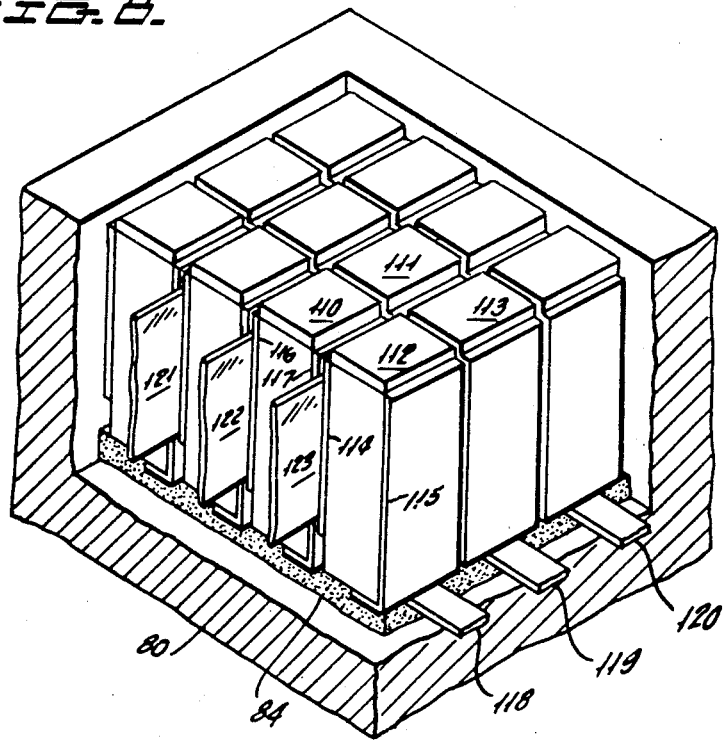
FIG. 8 illustrates the type mosaic shown in FIG. 7 which uses piezoelectric elements.

While the foregoing embodiments have illustrated the formation of an array of magnetostrictive elements, it is also possible to sue piezoelectric elements. FIG. 8 illustrates one manner in which the array may be formed of piezoelectric elements in a manner analogous to that of FIG. 7. Thus, in FIG. 8 a plurality of piezoelectric elements such as elements 110, 111, 112 and 113 are provided in the manner shown in FIG. 7 for elements 81, 82 and 83. The upper surfaces of elements 110 through 113 carry rubber film surfaces as previously indicated, and the elements are each mounted within the frame 80 by the bonding cement 84. Each of the individual elements are formed of any suitable piezoelectric material such as polarized lead zirconiumtitanate, or the like, and are provided with opposing electrodes, such as the opposing electrodes 114 and 115 for element 112 and electrodes 116 and 117 for element 110.

One of the electrodes of each of the elements, such as electrodes 115 and 117 are elongated and bent around the bottom of their respective members so that they can make contact with conductive strips, such as conductive strips 118, 119 and 120 which serve as the "word line" for the array. The "bit lines" are formed by insulating sheet members 121, 122 and 123 which extend perpendicular to word lines 118 through 120 and are conductively coated on one surface so as to be electrically connected to the other electrode of the various elements. For example, conductor 123 is electrically engaged by surfaces 114 and 126 of elements 112 and 113, respectively.

The end result of this novel arrangement is that a bit line is electrically connected to one electrode of each element of the array while a word line is electrically connected to the other of the elements of the array. Therefore, when there is one simultaneous energization, for example, bit line 123 and word line 118, an electrostatic field is crested between the electrodes 114 and 115, whereupon the element 112 will contract in length to be held away from the diffusing boundary area adjacent element 112.

Figure 8A:
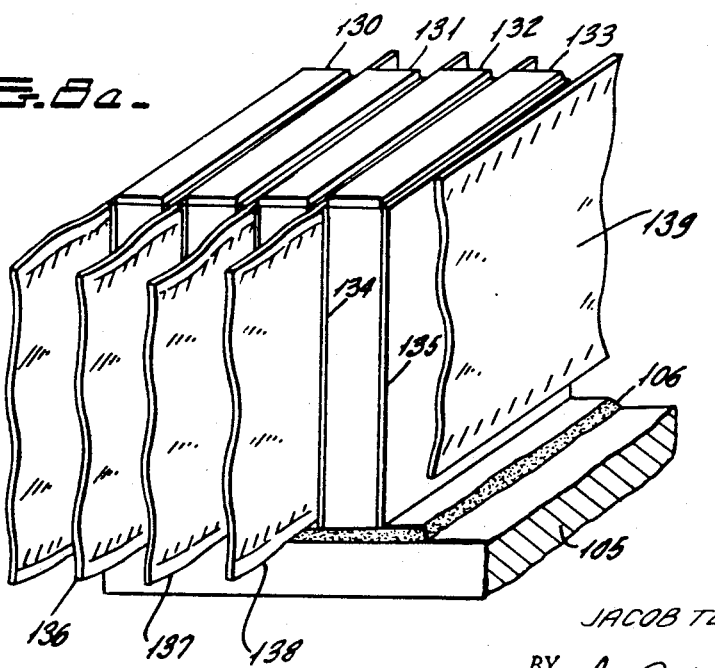
FIG. 8a illustrates the manner in which longitudinally extending piezoelectric elements or slabs can be arranged in an array.

Clearly, the piezoelectric material of FIG. 8a could be formed of elongated members formed in a row of the manner of FIG. 7b, as specifically shown in FIG. 8a. Thus, in FIG. 8a, the base 105 receives slab-shaped piezoelectric elements 130 through 133 which each have rubber film surfaces as previously described. Each of slabs 130 through 133 then have opposing electrodes on their large area surface such as the plated electrodes 134 and 135 for element 133. A plurality of insulating sheets having metallized coatings on both sides, such as sheets 136 through 139, are then suitably arranged and are electrically connectable to suitable control circuitry. Thus, when sheets 138 and 139 are energized, the elements 133 will be caused to deflect in a manner similar to that of FIG. 7b.

The manner in which the array is mounted, whether it is formed in the manner shown in FIGS. 7, 7a, 7b, 8 or 8a is illustrated in FIG. 9 where the frustrator mosaic is indicated by numeral 150, which has mosaic elements therein, as indicated by the dotted lines. The upper rubber film surfaces of the various elements of mosaic 150 are then placed immediately adjacent the diffusing surface 151 of a glass plate 152.

The surface area of surface 151 is coextensive with the upper surface area of mosaic 150. Thus, if one or more elements of the mosaic are distorted from their normal position, the incident light indicated by arrows 153, at that particular surface area will not be diffused by surface 151.

This novel concept will now have a great number of possible applications which will be apparent to those skilled in the art as for display of numeric information, of the like.

This novel arrangement may also be usefully applied to indicator instruments of various types. By way of example, FIG. 10 illustrates a curved dial instrument which could, for example, indicate altitude and be driven in accordance with the present invention. More specifically, the instrument of FIG. 10 is comprised of a suitable housing 170 which has contained therein an annular prism 171 which has the increments of an indicating dial visible through front surface 172. The conical surface 173 of prism 171 is roughened and then receives an annular control array 174 whose inner surface normally engages surface 173 with the individual elements removable away from the surface by, for example, one wavelength. The frustrator array 173, while annular in configuration, will clearly be arranged in the manner indicated, for example, in FIGS. 7b and 8a with the elongated elements of the array lying in respective planes which pass through the axis of prism 171.

The housing 170 further contains a lamp 175 which passes light through the inner surface 176 of prism 171 and on to the reflecting surface 173 of prism 171. The surface 173 makes an angle with respect to illumination from lamp 175 which permits diffusion of light therefrom, except for engagement by the diffusion absorbing elements in contact therewith, so that under normal conditions the scale of surface 172 is dark. If, however, one of the slab-type elements in frustrator array 173 is energized, it is removed from engagement with surface 173 so that there will be substantial diffusion of light at this area. This reflection of light at the selected area will then show up on scale 72 as a bright line on a dark background.

Clearly, the circuitry which drives the frustrator array 174 will be connected to a suitable altitude measuring structure, or the like, wherein the measured altitude is suitably converted to energize the appropriate slab of the array 174.

In the instrument of FIG. 10, the scale markings are placed directly on face 172 of prism 171. Thus, the dial preferably should have separate illumination so that the scale markings can be seen.

These scale markings may also be provided by etching them directly into the reflecting surface 173 so that the etched markings will scatter and reflect the light which comes from lamp 175. Thus, the scale markings will appear bright in a dark background, and separate illumination of the face of the instrument is not required.

It is also possible, of course, to have the background normally illuminated, with both numerals and "pointer" being formed of darkened areas in the illuminated background. In this arrangement, the control array normally does not interfere with diffusion. However, the etched markings are filled with a darkened pigment so that the numerals are observed as dark areas, while the flexure of the suitable control mosaic element will prevent light diffusion at the selected point.

FIGS. 11 and 12 illustrate the manner in which the invention may be used for a straight scale type indicating instrument. Referring first to FIG. 11, I have illustrated therein, for an altimeter, for example, a housing 180 which has a dial face 181 which has a cut-out 182 therein. A prism 183 is then mounted adjacent opening 182, while a control array generally shown as array 183a is mounted adjacent the diffusing surface 184 of prism 183. The array 183a is best shown in FIG. 12 as including a mounting frame 185 which receives a stack 186 of suitable deflectable stacked elements which may be stacked in the manner illustrated in FIG. 7b or 8a.

The diffusing surface 184 or prism 183 is mounted directly atop the upper surface of array 186 and the black rubber film surface elements engage surface 184. Two spacers 187 and 188 are then located at either end of stack 186 which is suitably cemented to the base 185 by the cement 189. The spacers 187 and 188 insure suitable spacing of the main frame 190 from the base 185. Note that prism 183 has a notch 196 adjacent its viewing surface 197 which is received by the projecting ledge 198 of frame member 190, thereby holding prism 183 in position with respect to elements 185. The upper surface of array 186 is held firmly against the surface 184 of prism 183 by pressure from springs 194, 195 and 196, which are held by retaining screws 191, 192 and 193.

A suitable light source including the lamps 200 (FIG. 11) and reflector 201 is then arranged to pass light through illumination windows 201 and 202 of frame member 190 and toward the reflecting surface 184 of prism 183.

The operation of the straight scale instrument device of FIG. 11 is believed clear in that the scale is normally darkened, since there is no diffusion of light by surface 184. Once, however, one of these elements is energized by suitable energizing circuitry, it will contract and thus be removed from the surface 184 to a distance great enough to permit substantial diffusion at that point.

Accordingly, an illuminated line will appear across the scale viewed through window 182. Note that the calibrating numerals on the scale may be applied thereto as described in FIG. 10.

In the embodiment of FIGS. 11 and 12, good performance will result where the scale length is of the order of 5 inches, while the array 186 includes approximately 50 piezoelectric elements per inch. In driving this type structure, it is, therefore, necessary to select and energize one of the 256 elements of the array for each value of input signal. This input signal may be made available in eight-bit parallel digital form, although other forms of digital and analog inputs may be applied equally well. It is, of course, possible to design a straight-forward decoder for the eight-bit input according to any of the well-known techniques. Thus, one electrode of each of the 256 elements of array 186 would be connected to a common ground bus, while any one of the 256 free electrodes would be selected and energized by the output of an eight-bit decoder.

Figure 13:
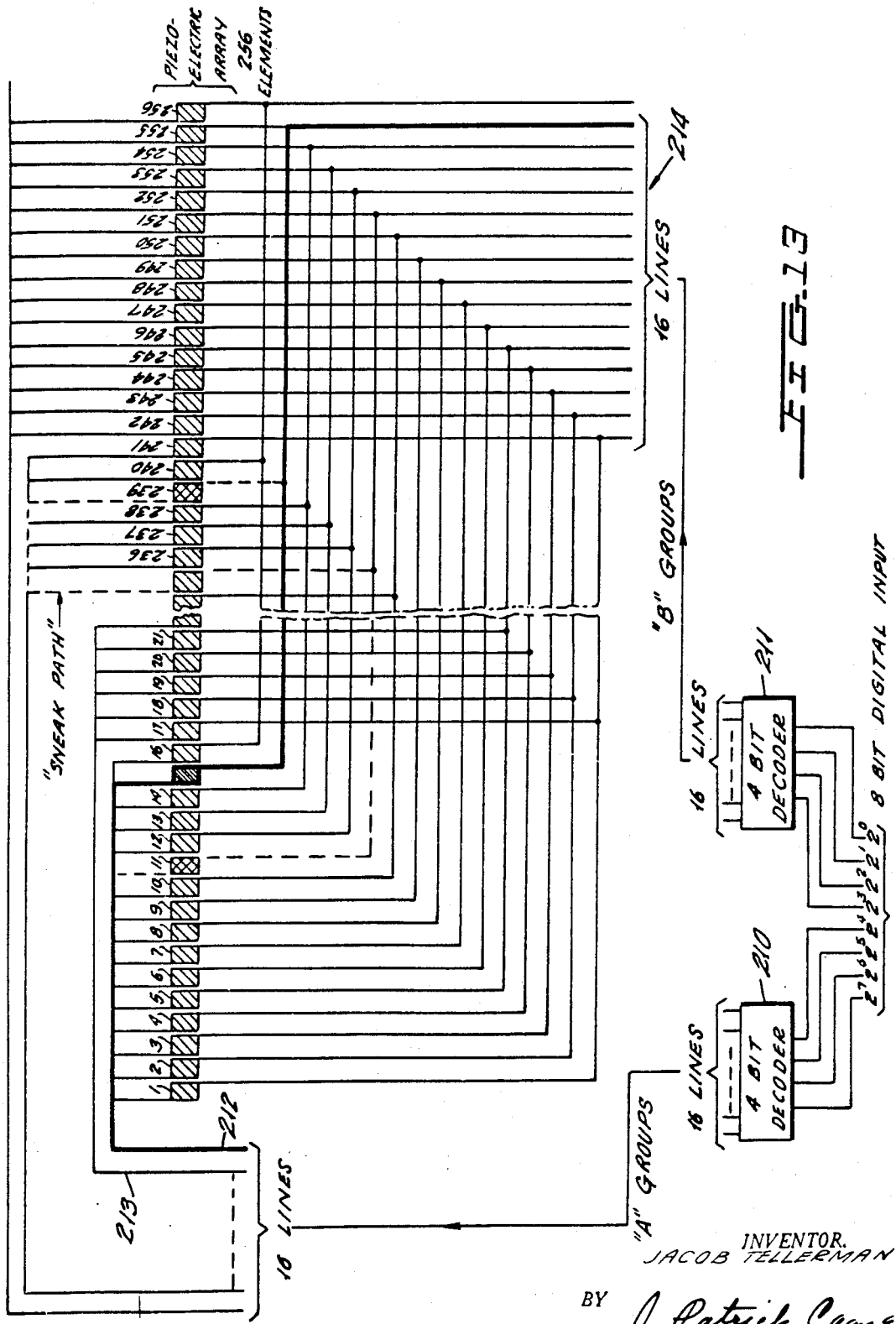
FIG. 13 schematically illustrates a control circuitry for driving the piezoelectric array of elements of FIGS. 12 and 13.

While standard selection techniques could be utilized, FIG. 13 illustrates a signal selection circuit which reduces to a substantial degree the amount of hardware required.

In FIG. 13 I have illustrated an eight-bit digital input which has the four high bit positions connected to a four-bit decoder 210, while the four lower bits are connected to a second four-bit decoder 211. The 256 piezoelectric elements of the array of FIGS. 11 and 12 are then laid out as indicated. The left-hand electrodes of each of the piezoelectric elements are then grouped in 16 groups of 16 elements. Thus, the elements 1 through 16 have their left-hand electrodes grouped together and connected to a common bus 212.

In a similar manner, each of the left-hand electrodes are grouped together to form a total of 16 groups of 16 elements. Each of these groups which shall, for convenience, be called A-groups then have their 16 buses connected to the four-bit decoder 210. The four-bit decoder 210 is then capable of applying +B volts on a selected bus of one of the 16 buses.

The right-hand electrodes of each of the piezoelectric elements are similarly grouped into 16 groups of 16 elements which are connected to respective buses of buses 214. However, in the grouping of the right-hand electrodes, which shall be called B-groups, only one element from each of the A-groups will appear in each B-group. The B-groups are then connected as illustrated to the four-bit decoder 211 which can apply a voltage of −B volts to any of the selected buses of group 214.

In operation and assuming that the selected piezoelectric elements to be energized is the 15th of the 256 elements, those buses in the A-group and B-group which each include element number 15 will be energized, as illustrated by the heavy line, whereupon a voltage of 2B will be applied to the electrodes of element 15 to cause it to extend. Clearly, any of the remaining elements can be selected in a similar manner.

It is to be noted that this grouping arrangement of FIG. 13 can lead to the existence of sneak paths where the voltage is applied across series combinations of several elements. Such sneak paths can be easily avoided by connecting a diode in conductors leading to each of the left or right-hand electrodes of each of the piezoelectric elements.

Alternatively, the effect of sneak paths may be reduced by using the non-linear characteristics of the piezoelectric material, whereby the amount of motion resulting from partial excitation is negligible compared to that resulting from full excitation.

While the circuit of FIG. 13 is particularly applicable for use with piezoelectric elements, it will be apparent to those skilled in the art that the concepts of FIG. 13 can also be applied to a magnetostrictive array with suitable modification made so that a current will be passed through the selected element rather than a voltage applied across the selected element.

Figure 14:
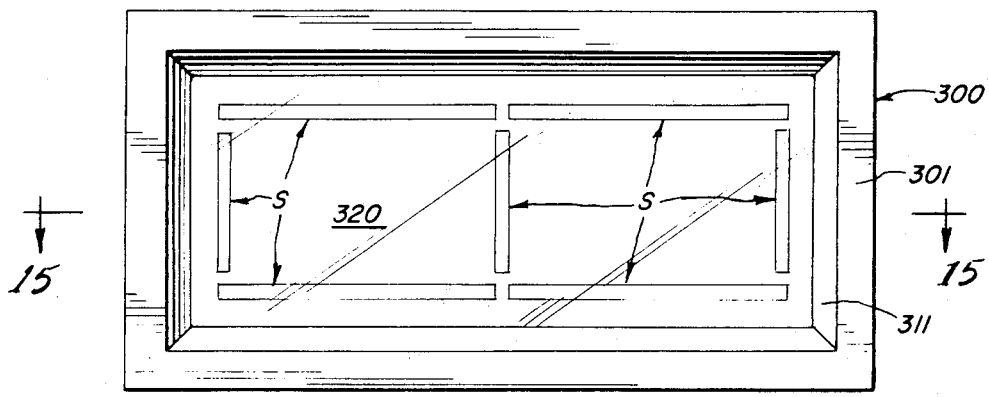
FIG. 14 is a front elevational view illustrating another embodiment of display device constructed in accordance with this invention.
Figure 15:
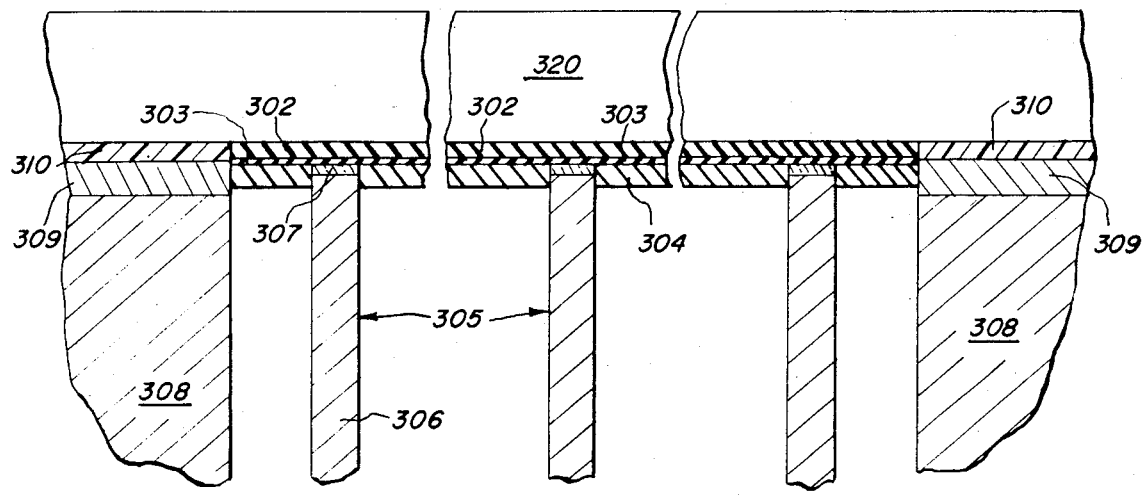
FIG. 15 is an enlarged fragmentary sectional view with parts thereof broken out and is taken approximately as indicated by the line 15—15 on FIG. 14.
Figure 16:
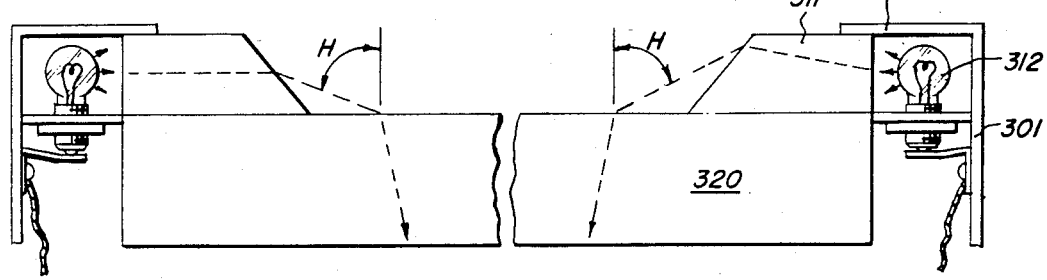
FIG. 16 is an enlarged fragmentary transverse view showing the edge detail arrangement for a display device of the type shown in FIG. 14 and incorporating self-illumination.

Another embodiment of a display device is shown in FIGS. 14–16 wherein the display is characterized by white symbols against a black background. The display device 300 is shown to include a casing 301 framing a background area which is normally black, as represented by shading in FIG. 14, with the symbols that are to be displayed being shown as elongated white stripes. In the illustrated embodiment, a set of seven white stripes or line symbols is arranged for individual selection in order to define any of digits 0 through 9.

In the embodiment shown in FIG. 14, a panel 320 of light transparent material, such as glass, has provided on its rear face a film of transparent rubber 302 and a covering film 303 of white opal rubber. The transparent film 302 on the rear face of the glass panel simply gives high elasticity while the opal rubber film provides a display surface that constitutes an optical boundary capable of diffusing light impinging thereon after travel through the glass panel 320 in a direction that obliquely intercepts the general profile of the optical boundary. The opal film 303 has a diffusion action in its interior and has an exterior surface of diffused texture. Instead of white, the opal film 303 could be red, yellow or of any other suitable color. To provide a normally black background, a relatively thick layer 304 of black rubber overlies the entire surface of the film 303 except for the regions where frustrators 305 are provided.

The stripes that are to appear on the display are defined by a set of frustrators 305 located adjacent the optical boundary to regulate contact therewith. In the illustrated embodiment, each frustrator 305 includes a compactor 306 that serves to position the glass strip in contact with the rubber layer 303, each compactor having a strip 307 of black glass mounted upon its movable end portion so as to provide a black region when light absorbing contact exists. In particular, each compactor is a solid state element, such as a piezoelectric or ferromagnetic device, which upon actuation changes its length on the order of a wavelength of light. The compactors are mounted within the casing 301 and activated in accordance with any of the arrangements shown in FIGS. 7 through 8A. In the fabrication of the device, all of the frustrators are held compressed against the layer 303 while the black background layer 304 is poured and cured in situ.

The casing 301 is equipped with support pedestals 308 which have rigid engagement with the glass panel 320. As shown, the support pedestals 308 carry a brass block 309 secured thereon by adhesive and serving as a temperature compensation means, the brass block 309 having black cement 310 upon its free end for securement directly to the rear surface of the glass panel 320, there being no rubber layers at the region of attachment of the support structures because the supports are fixed to the glass panel prior to depositing the rubber layers.

The black glass strips 307 on the movable ends of the compactors have the same index as the opal rubber 303 so that the display area appears totally and uniformly black when the compactors are in light absorbing contact with the rubber film 303.

The embodiment of FIGS. 14, 15 and 16 is shown as including a picture frame type edge lens 311 for directing light from internally mounted bulbs 312 which are located within edge channels provided between the front rim 301F of the instrument casing and the outer edge faces of the lens.

To provide a display of any digit from 0 to 9, the frustrators are electrically actuated in a sense to shorten each corresponding compactor to thereby withdraw its attached strip 307 sufficiently to convert the line-like region of the optical boundary from a light absorptive condition to a light reflective condition. In the light reflective condition for the illustrated embodiment, an air space exists between the black glass and the surface of the opal film.

As previously indicated, it will be apparent that the display does not require self-illumination but may be viewed under ambient light. In either instance, an important feature of the arrangement is that the brightness of the ambient light does not wash out the indications produced by actuation of one or more of the frustrators.

Thus, while preferred constructional features of the invention are embodied in the structure illustrated herein, it is to be understood that changes and variations may be made by those skilled in the art without departing from the spirit and scope of the appended claims.

What is claimed is:

1. A display device comprising display surface means including an element of light transparent material providing an optical boundary having regions thereof capable of diffusing light impinging thereon after travel through said element along a direction that obliquely intercepts the general profile of said optical boundary, a plurality of members of opaque material disposed in confronting relation to corresponding portions of said regions, and means for selectively controlling positioning of said members between engagement and disengagement with said corresponding portions to cause light absorption and light reflection, respectively, at said corresponding portions.

2. A display device as defined in claim 1 and wherein said optical boundary has regions alongside said corresponding portions to act as background for said corresponding portions.

3. A display device as defined in claim 1 wherein sad optical boundary has regions alongside said corresponding portions and capable of diffusing said light to act as background for said corresponding portions.

4. A display device as defined in claim 1 and wherein said optical boundary has regions alongside said corresponding portions and covered by an opaque layer to act as background for said corresponding portions.

5. A display device as defined in claim 1 and wherein said regions comprise substantially the entire optical boundary and an opaque layer covers substantially all of the optical boundary other than said corresponding portions to act as background for said corresponding portions.

6. A display device as defined in claim 1 wherein said positioning means includes separate solid state elements mounting said members and means for exciting each of said solid state elements to produce a deflection on the order of one wavelength of visible light.

7. A display device as defined in claim 6 wherein each solid state element has a non-linear deflection response to produce appreciable dimensional change only upon full excitation and said exciting means comprises cooperating means for controlling energization at opposite sides of said solid state element for applying full excitation only when both said cooperating means are active.

8. A display device as defined in claim 1 wherein said element has an irregular surface contour constituting said optical boundary and said opaque members are of resiliently compressible material.

9. A display device as defined in claim 1 wherein said element is a glass panel having an etched surface constituting said optical boundary and characterized by surface irregularities of about 15 to 40 microinches deep, each of said opaque members being of resiliently compressible material, and said positioning means including separate solid state elements mounting said opaque members and means for exciting said solid state elements to produce a deflection of about 1 wavelength of visible light, each solid state element carrying one of said opaque members adjacent said etched surface to control compressible engagement therebetween.

10. A display device as defined in claim 1 wherein said element is a glass panel having a layer of opal-like material defining said regions capable of diffusing light.

11. A display device as defined in claim 10 and including an intermediate layer of transparent rubber-like material disposed between said panel and said layer of opal-like material.

12. A display device as defined in claim 10 and wherein each of said opaque members is of rigid material.

13. A display device as defined in claim 1 and wherein said element is a glass panel having a smooth rear face, a layer of opal-like resiliently compressible material overlying said rear face to define said optical boundary and each of said opaque members being of rigid material.

14. A display device as defined in claim 13 and including a background layer of opaque rubber-like material overlying substantially all of the optical boundary other than said corresponding portions to act as background for said corresponding portions.

15. A display device as defined in claim 1 and including a plurality of support means secured to said element of light transparent material to locate the same in predetermined position relative to said opaque members, each support means including a main pedestal and a temperature compensation block secured to the pedestal.

16. A display as defined in claim 1 and including a picture frame type edge lens overlapping said element of light transparent material and means for directing light through outer peripheral face regions of said lens to exit therefrom and travel through an air path to impinge upon said element for providing self-illumination of the display device.

17. A display device comprising an element of light transparent material having a display surface constituting an optical boundary capable of diffusing light impinging on said surface after travel through said element along a direction that obliquely intercepts the general profile of said boundary, a member of opaque material disposed adjacent to said surface and means for controlling compression of said member into light absorbing compressed relationship with selected regions of said surface whereby said selected regions appear light absorptive and the remainder of the surface appears light reflective.

18. In a display device comprising an element of light transparent material having a display surface constituting an optical boundary capable of diffusing light impinging thereon after travel through said element along a direction that obliquely intercepts the general profile of said boundary, a member of opaque material disposed adjacent to said surface and means for controlling compression of said member into light absorbing compressed relationship with selected regions of said surface, the improvement wherein said element comprises a panel of transparent material having a first layer of transparent rubber-like material and a second layer of opal-like material that defines said optical boundary, said member of opaque material being disposed adjacent said second layer and said means for controlling compression normally holding said member in compressed relation with selected regions of said second layer whereby said selected regions appear light absorptive and being energizable to withdraw said member from said second layer sufficiently to convert said selected regions to be light reflective.

19. In a display device as defined in claim 18 wherein said opaque member is of rigid material.

20. In a display device as defined in claim 18 and including a background layer of opaque rubber-like material of substantially greater thickness than the first-named layer, said background layer overlying substantially all but said selected regions of said surface.

21. In a display device as defined in claim 18 and wherein said compression controlling means includes a solid state element having a movable end and means for exciting said solid state element to produce a deflection on the order of one wavelength of visible light of said end and said opaque member is glass in rigid securement on the end of the solid state element.

* * * * *